Sept. 1, 1936. S. C. CLARK ET AL 2,052,605

FLEXIBLE BACKING FOR FLOOR COVERINGS AND THE LIKE

Filed March 25, 1935

INVENTORS
SAMUEL C. CLARK
HARRY M. PRYALE
DON R. COTTERMAN
BY
ATTORNEY

Patented Sept. 1, 1936

2,052,605

UNITED STATES PATENT OFFICE 2,052,605

FLEXIBLE BACKING FOR FLOOR COVERINGS AND THE LIKE

Samuel C. Clark, Harry M. Pryale, and Don R. Cotterman, Pontiac, Mich.

Application March 25, 1935, Serial No. 12,946

4 Claims. (Cl. 154—49)

This invention relates generally to backings for use in association with floor coverings, and refers more particularly to an improved flexible backing applicable in practically all cases where a high degree of resiliency is desired.

One of the principal objects of this invention consists in the provision of a backing possessing maximum cushioning qualities and, in addition, having sound deadening as well as heat insulating characteristics.

Another advantageous feature of the present invention consists in the provision of a flexible backing impervious to moisture, and having a plurality of hollow projections or pads extending from one side thereof for engaging the supporting surface. In accordance with this invention, the hollow pads or projections form air pockets, which not only appreciably increase the cushioning qualities and flexibility of the backing, but also render it possible to reduce the weight, as well as the cost of manufacture, due to the minimum material required to form the backing.

A further feature of this invention resides in the provision of a backing of the character set forth in the preceding paragraph molded from rubber or from a material containing a rubber composition and capable of being permanently secured to the covering for which the same forms a backing, so as to provide a unitary construction.

The foregoing, as well as other objects, will be made more apparent as this description proceeds, especially when considered in connection with the accompanying drawing, wherein.

Figure 1:
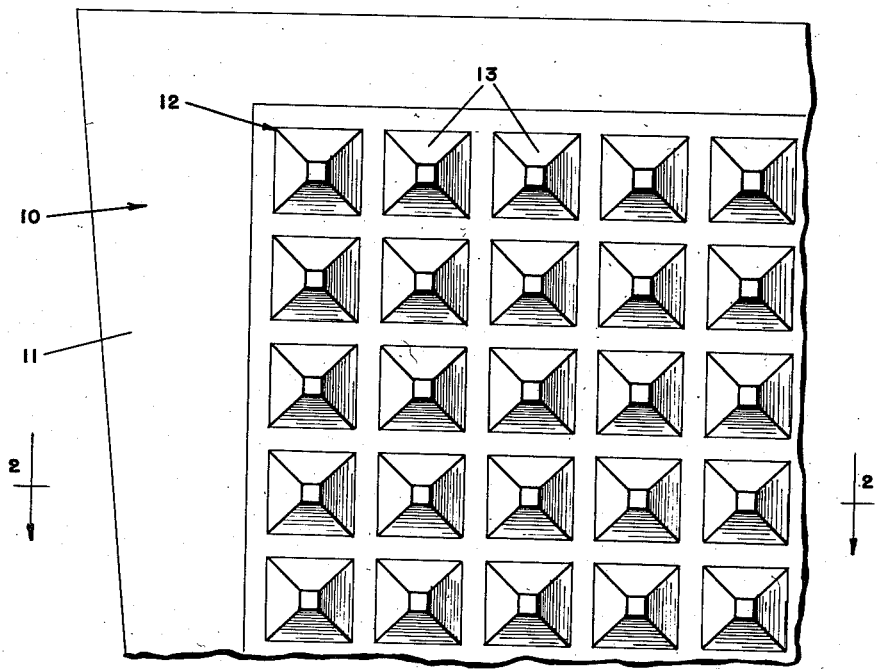
Figure 1 is a bottom elevational view of a backing constructed in accordance with this invention and applied to a suitable covering material.

Although it will be apparent as this description proceeds, that the backing forming the subject matter of the present invention is capable of many and diversified uses, nevertheless, for the purpose of illustration we have shown the same as employed in association with a floor covering. The floor covering designated by the reference character 10 in the drawing is suitable for use as a mat on the flooring of vehicle bodies, and in the present instance is shown as comprising a relatively thin sheet 11 preferably molded from rubber or from a material containing a rubber composition. Irrespective of the material from which the sheet 11 is formed, the same is preferably impervious to moisture and possesses a high degree of flexibility, so as to permit the same to readily conform to any variations in the contour of the floor adapted to be covered thereby.

Figure 2:
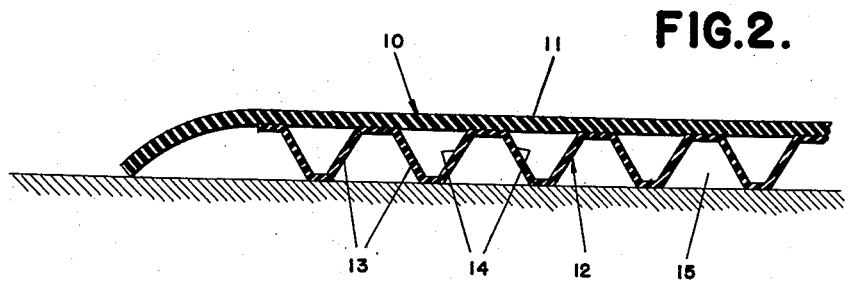
Figure 2 is a cross sectional view taken on the line 2—2 of Figure 1.

In practically all installations of floor coverings, whether in vehicle bodies or not, it is highly desirable to provide a cushioning effect, and in many instances the installation requires effective sound absorbing, as well as heat insulating qualities. The present invention provides for realizing all of the foregoing desired characteristics in the installation by incorporating a backing 12 for the covering possessing maximum cushioning qualities and having sound deadening, as well as heat insulating characteristics. As shown in Figure 2, the desirable characteristics previously set forth are obtained by providing a plurality of hollow projections or support engaging pads 13 on the backing forming with the covering material 11 a series of air pockets 14. In the present instance, each of the support engaging pads forming the air pockets 14 simulate in shape, an inverted frusto-pyramid, although it will be understood that various different shapes may be imparted to the pads without departing from the spirit and scope of this invention. Irrespective of the particular shape of the pads 13, the latter are preferably spaced from each other so that the air pockets 14 formed by the pads cooperate with the space 15 around the pads to provide a layer of air between the covering 10 and the supporting surface engaged by the pads. As a matter of fact, the air surrounding the pads actually circulates beneath the covering with the result that the heat is effectively dissipated.

As pointed out above, the sheet 11 of the covering 10 is formed of a highly flexible material so as to permit the same to readily conform to variations in contour of the surface to be covered, and accordingly, the backing 12 is also formed of a highly flexible material, so as not to interfere with the bending of the sheet 11. In accordance with this invention, the backing is molded from a material containing rubber and is cemented or otherwise permanently secured to the sheet 11 so as to form a unitary construction. Such an arrangement is desirable in that it facilitates assembly and materially expedites handling. In connection with the flexibility of the covering equipped with the backing, it may be pointed out that due to the compressibility or hollow nature of the pads, the unit may be rolled just as compactly as if the backing were omitted and this is, of course, desirable in that it conserves storage space. Attention is also directed to the fact that upon assembling the backing with the sheet 11, a sufficient margin of the latter beyond the backing is provided to permit the marginal edge of the sheet to engage the supporting surface and thereby conceal the backing.

Thus from the foregoing, it will be observed that we have provided a relatively simple and inexpensive backing, possessing maximum cushioning qualities and having sound deadening, as well as heat insulating properties. It will further be apparent that the backing is impervious to moisture and due to its relatively high degree of flexibility may be permanently secured to the covering, without interfering with deforming or handling the unit, either during installation or shipping the same.

While in describing the present invention, particular stress has been placed upon the use of the backing in association with a rubber covering sheet, nevertheless, it is to be understood that the present invention contemplates the use of the backing wherever a high degree of resiliency is desired. Accordingly, reservation is made to make such changes in the specific embodiment of the invention as may come within the purview of the accompanying claims.

What we claim as our invention is:

1. A floor mat having a flexible covering and having a padding secured to the underside of the covering, said padding comprising a sheet of flexible material having hollow support engaging projections extending from the underside of the padding for engagement with a supporting surface and spaced from each other in a plurality of directions to provide an air space around each projection.

2. A floor mat having a flexible covering and having a padding secured to the underside of the covering, said padding comprising a sheet of flexible material having hollow frusto pyramidal support engaging projections extending from the underside of the padding for engagement with a supporting surface and spaced from each other in a plurality of directions to provide an air space around each projection.

3. A floor mat having a flexible covering and having a padding secured to the underside of the covering, said padding comprising a sheet of flexible material having hollow support engaging projections extending from the underside of the padding for engagement with a supporting surface, said projections being spaced from each other in a plurality of directions and each projection cooperating with the underside of the covering to form a sealed air chamber.

4. A floor mat having a padding comprising a sheet of rubber material having hollow support engaging projections extending from the underside of the sheet for engagement with a supporting surface and spaced from each other in a plurality of directions to provide an air space around each projection, and a covering material extending over the padding and secured thereto, said covering material having flexible marginal edge portions projecting beyond the marginal edges of the padding a sufficient distance to engage the supporting surface beyond said padding.

SAMUEL C. CLARK.
HARRY M. PRYALE.
DON R. COTTERMAN.